United States Patent
Snider

(10) Patent No.: US 7,393,900 B2
(45) Date of Patent: Jul. 1, 2008

(54) FLUID AND HEAT RESISTANT CHLORINATED POLYETHYLENES (CPE)

(75) Inventor: Matthew S. Snider, Madison, OH (US)

(73) Assignee: Excel-Polymers, LLC, Solon, OH (US)

(*) Notice: Subject to any disclaimer, the term of this patent is extended or adjusted under 35 U.S.C. 154(b) by 425 days.

(21) Appl. No.: 11/001,905

(22) Filed: Dec. 2, 2004

(65) Prior Publication Data

US 2006/0122316 A1    Jun. 8, 2006

(51) Int. Cl.
*C08L 33/14* (2006.01)

(52) U.S. Cl. .................. 525/192; 525/212; 525/213; 525/221; 525/222; 525/223; 525/227; 525/228

(58) Field of Classification Search .............. 525/192, 525/212, 213, 221, 222, 223, 227, 228
See application file for complete search history.

(56) References Cited

U.S. PATENT DOCUMENTS

| | | | | |
|---|---|---|---|---|
| 4,309,332 A | * | 1/1982 | Fischer et al. | 523/212 |
| 4,778,856 A | * | 10/1988 | Chen et al. | 525/190 |
| 4,882,838 A | * | 11/1989 | Jones et al. | 29/829 |
| 6,344,525 B1 | | 2/2002 | Lee et al. | |
| 2003/0153652 A1 | | 8/2003 | Tsujimura et al. | |

FOREIGN PATENT DOCUMENTS

JP      55036204    *    3/1980

OTHER PUBLICATIONS

European Search Report, Appln. No. 06 01928.7-2109, Oct. 20, 2006.

* cited by examiner

*Primary Examiner*—Bernard Lipman
(74) *Attorney, Agent, or Firm*—Benesch, Friedlander, Coplan & Aronoff LLP

(57) ABSTRACT

A chlorinated rubber composition which is resistant to various fluids such as transmission fluids comprises a blend of a chlorinated polyethylene elastomer, an ethylene acrylic elastomer and/or polyacrylic rubbers, and optionally a chlorosulfonated polyethylene. The rubber composition has many uses such as a tube and generally contains various additives such as fillers, plasticizers, vulcanizing agents, and the like.

A heat resistant rubber composition comprises a blend of a chlorinated polyethylene elastomer, an ethylene-acrylic elastomer and/or polyacrylic rubbers, an ethylene-octene copolymer, and an ethylene-propylene-diene terpolymer, and the same can be used as a cover or jacket as on the above chlorinated rubber tube.

14 Claims, No Drawings

FLUID AND HEAT RESISTANT CHLORINATED POLYETHYLENES (CPE)

FIELD OF THE INVENTION

The present application relates to chlorinated polyethylene rubber compositions which have good fluid resistance, e.g. automatic transmission fluids, or have good high heat resistance.

BACKGROUND OF THE INVENTION

Heretofore, numerous rubber compounds were utilized as sheets, tubings, liners, and the like. However, generally no chlorinated polyethylene rubber compositions have existed which had good resistance to transmission fluids, especially the recent new types of "E-fluids".

Similarly, while numerous types of high temperature-resistant rubbers were available, generally no blend of a chlorinated polyethylene elastomer, an ethylene-octene copolymer, and an ethylene-acrylic and/or a polyacrylic elstomer was known which had good heat resistance as at approximately 150° C.

SUMMARY OF THE INVENTION

Fluid resistant rubbers generally comprise 70 parts by weight of chlorinated polyethylene, and about 5 to about 49 parts by weight of an ethylene-acrylic elastomer having a Mooney viscosity (ML 1+4/100° C.) of about 10 to about 25 and/or a polyacrylic elastomer having a Mooney viscosity of from about 10 to about 70.

Rubber compositions having good high heat resistance generally comprise 70 parts by weight of a chlorinated polyethylene rubber containing from about 25% to about 45% chlorine by weight, from about 5 to about 49 parts by weight of an ethylene-octene copolymer having an octene content of from about 25% to about 55% by weight, from about 5 to about 49 parts by weight of an ethylene-acrylic elastomer having a Mooney viscosity of from about 10 to about 25 and/or an polyacrylic rubber having a Mooney viscosity of from about 10 to about 70, and optionally from about 10 to about 50 parts by weight of an EPDM rubber containing from about 30% to about 70% by weight of ethylene repeat units and from about 0.1% to about 8% of diene repeat units.

DETAILED DESCRIPTION OF THE INVENTION

Fluid Resistant Rubber Compositions

The various components of the chlorinated rubber composition are based upon 70 parts by weight of at least one chlorinated polyethylene elastomer. The chlorinated elastomer generally contains from about 25% to about 50% by weight, desirably from about 30% to about 45% by weight, and preferably from about 36% to about 42% by weight of chlorine therein. Examples of suitable chlorinated polyethylene elastomers are known to the literature and to the art and specific commercial examples of such compounds include Tyrin CM 0836 which contains approximately 36% by weight of chlorine and has a Mooney viscosity (ML 1+4/100° C.) of about 100, Tyrin CM 0136 which contains approximately 36% by weight of chlorine and has a Mooney viscosity of about 80, and Tyrin CM 4211P which contains approximately 42% by weight of chlorine and has a Mooney viscosity of about 80. All of the Tyrin chlorinated polyethylene elastomers are available from DuPont Dow.

Whenever reference is made to a Mooney viscosity in the present invention it is an (ML 1+4/100° C.) Mooney viscosity.

An important aspect of the chlorinated polyethylene elastomers of the present invention is that they are desirably curable by peroxides such as those set forth herein below, as well as by various thio compounds such as thiadiazole derivatives, and also by irradiation. If two or more chlorinated polyethylene elastomers are utilized, the range of any one elastomer can generally be from about 1% to about 99% by weight and desirably from about 25% to about 75% by weight based upon the total weight of all of the chlorinated polyethylene elastomers.

Another important component of the chlorinated rubber composition is at least one ethylene-acrylic elastomer wherein the acrylic can be an alkyl acrylate wherein the alkyl portion desirably has from about 1 to about 8 carbon atoms and preferably is methyl acrylate. The ethylene-acrylic elastomer generally has a Mooney viscosity of from about 10 to about 25 and desirably from about 13 to about 19. The total amount of the one or more ethylene-acrylic elastomers is generally from about 5 to about 49 parts, desirably from about 5 to about 40 parts, and preferably from about 25 to about 35 parts by weight per 70 parts by weight of said one or more chlorinated polyethylene elastomers. Examples of suitable ethylene-acrylic elastomers include the various Vamac elastomers available from DuPont Industrial Polymers such as Vamac D, Vamac DLS, Vamac G, Vamac GLS, and Vamac HG with Vamac DP being highly preferred.

In lieu of the ethylene-acrylic elastomer or in any portion therewith, one or more polyacrylate elastomers can be utilized which are known to the art and to the literature. Generally, polyacrylate elastomers contain repeat units of alkyl acrylates wherein the alkyl portion desirably has from 1 to about 8 carbon atoms, and preferably is methyl acrylate or ethyl acrylate. Generally lesser amounts of alkoxy acrylates are also utilized wherein the alkoxy portion generally has from 1 to 5 carbon atoms with methoxy or ethoxy being preferred. The Mooney viscosity of the one or more acrylate elastomers is generally from about 10 to about 70 and preferably from about 25 to about 40 or 55. The amount of the polyacrylic elastomers is generally from about 5 to about 49 parts, desirably from about 5 to about 40 parts, and preferably from about 25 to about 35 parts by weight per 70 parts by weight of said chlorinated polyethylene elastomers. The polyacrylic elastomer can be utilized either in lieu of the one or more ethylene-acrylic elastomers or partially substituted therefore. In other words, any combination of the ethylene-acrylic elastomers or the polyacrylic elastomers can be utilized with the total amount of both being from about 5 to about 49 parts by weight, desirably from about 5 to about 40 parts by weight and preferably from about 25 to about 35 parts by weight per 70 parts by weight of said polychlorinated polyethylene elastomers. Inasmuch as the present invention generally relates to peroxide cure, polyacrylates are utilized which are curable by a peroxide. Since the polyacrylates have a saturated backbone, crosslinking is accomplished via incorporation of a co-polymerized reactive cure site such as through the use of suitable peroxide reactive compounds such as a carboxylic acid, and the like. A suitable polyacrylic elastomer is HyTemp PV-04 made by Zeon Chemicals.

An optional but desired component of the chlorinated rubber composition is a chlorosulfonated polyethylene which generally contains from about 25% to about 45%, desirably from about 30% to about 40% and preferably from about 33% to about 38% by weight of chlorine therein. The amount of sulfur is generally very low as from about 0.25% to about 2%, desirably from about 0.5% to about 1.5%, and preferably from about 0.75% to about 1.25% by weight based upon the total weight of the chlorosulfonated polyethylene. One or more chlorosulfonated polyethylenes when utilized is generally from about 5 to about 49 parts by weight, desirably from about 10 to about 40, and preferably from about 25 to about 35 parts by weight per 70 parts by weight of said one or more chlorinated polyethylene elastomers. Examples of such suitable compounds include the various Hypalon compounds from DuPont Dow such as Hypalon 20, Hypalon 30, with Hypalon 40 being preferred which contains approximately 35% chlorine by weight and approximately 1% sulfur by weight.

The chlorinated rubber composition of the present invention is compounded utilizing generally conventional additives known to the art and to the literature such as activators and/or acid scavengers, processing aids, various fillers which can also serve as reinforcing aids, plasticizers, vulcanizing compounds such as various peroxides, co-agents such as curing activators, lubricants, stabilizers, and the like.

Activators and/or acid scavengers include various metal hydroxyls and/or carbonates such as magnesium aluminum hydroxy carbonate, metal oxides such as magnesium dioxide, lead oxide, organic lead bases, and the like. A preferred activator/acid scavenger is Maglite D or DE produced by the C.P. Hall Company. The total amount of such activator and/or acid scavenger(s) is generally low such as from about 3 to about 20 and desirably from about 5 to about 15 parts by weight per 70 parts by weight of said one or more chlorinated polyethylene elastomers.

Processing aids include various waxes such as low molecular weight polyethylene waxes, polystyrene waxes, paraffin wax, fatty acids, and the like with the polyethylene waxes being preferred. Suitable amounts of processing aid(s) generally range from about 0.1 to about 10 and desirably from about 1 to about 5 parts by weight per 70 parts by weight of said one or more chlorinated polyethylene elastomers.

Suitable fillers include Kaolin clay, mica, calcium, carbonate, and the like. The amount of said filler(s) is generally from about 5 to about 80 parts by weight per 70 parts by weight of said one or more chlorinated polyethylene elastomers. Reinforcing fillers such as carbon black preferably have high surface area and iodine numbers of from about 25 to about 32. Specific examples include an N762, N774, N550, and N990 produced by Cancarb. The amount of the reinforcing agent(s) is generally high as from about 50 to about 300 parts by weight, desirably from about 100 to about 250 parts by weight, and preferably from about 125 to about 200 parts by weight per 70 parts by weight of said one or more chlorinated polyethylene elastomers.

Numerous types of plasticizers can be utilized to impart heat and light stability such as one or more epoxidized soybean oils, various diphthalates such as diallyl phthalate, di-2-ethylhexyl phthalate, diisopropyl phthalate, linear $C_8$-$C_{10}$ phthalates, and linear $C_7$-$C_{11}$ phthalates; various trimellitates such as tri-2-ethylhexyl trimellitate, triisooctyl trimellitate, and triisononyl trimellitates; various adipates such as diisooctyl adipate, di-2-ethylhexyl adipate, diisononyl adipate, and diisodecyl adipate; various azelates such as di-2-ethylhexyl azelate; various glutarates such as diisodecyl glutarate; and various sebacates such as di-2-ethylhexyl sebacate. The total amount of the one or more different types of plasticizer(s) is generally from about 1 to about 60 parts by weight and desirably from about 7 to about 50 parts by weight per 70 parts by weight of said one or more chlorinated polyethylene elastomers.

The vulcanizing compound is desirably a peroxide and numerous types thereof are known to the art and to the literature. Examples of suitable peroxides include 4,4-bis(tert-butyl peroxy) butyl valerate, t-butyl perbenzoate, 2,5-dimethyl-2,5-di(t-butylperoxy)-3-hexyne, n-butyl-4,4-bis(t-butylperoxy)valerate, 1,1-bis(t-butylperoxy)3,3,5-trimethyl cyclohexane, di-(2-tert-butylperoxyisopropyl)benzene, dibenzoyl peroxide, 2,5-dimethyl-2,5-di(t-buylperoxy)hexane, dicumyl peroxide, and combinations thereof. Preferred peroxides include 2,2'-bis(tert-butylperoxydiisopropylbenzene) and 1-1-di(tert-butylperoxy)-3,3,5-trimethylcyclohexane available respectfully as Vulcup 40 KE and Trigonox 20-40B-PD both of which are available from Harwick Standard. A total amount of the one or more vulcanizing compounds is generally from about 0.1 to about 10 and desirably from about 3 to about 6 parts by weight per 70 parts by weight of said one or more chlorinated polyethylene elastomers.

Co-agents generally include two types with Type I serving to improve state of cure and also rate of reaction whereas Type II generally only affects state of cure. Examples of suitable Type I co-agents include methacrylate products such as, trimethylolpropane trimethacrylate (TMPTMA), and various Bis-maleimides such as N,N'-m-phenylene dimaleimide (HVA-2), and various acrylates such as trimethylolpropane triacrylate (TMPTA). Suitable Type II co-agents include triallyl cyanurate (TAC), triallyl isocyanurate (TAIC), diallyl terephthalate, and 1,2-Vinyl polybutadienes (Ricons), and the like. Numerous other co-agent exist and the same are known to the art and to the literature. The total amount of the one or more co-agents is generally from about 0.1 to about 15 parts by weight and desirably from about 3 to about 12 parts by weight per 70 parts by weight of said one or more chlorinated polyethylene elastomers.

The above various compounds and components are compounded and subsequently formed into desired end use shapes such as a tube. More specifically, a desired compounding process involves mixing all of the non-curing compounds (other than vulcanizing agents and co-agents) in any order in a continuous high shear mixer with the one or more polymers being added last. Thus, in any order, the one or more activators and/or acid scavengers, the one or more processing aids, the one or more fillers such as a reinforcing filler, and the one or more plasticizers are added singly in any order with continuous mixing until all of them have been added and blended in a high shear mixer. Generally any high shear mixer is suitable and a Thyssen Krupp GK 250 E was utilized in the following examples. After all the various additives have been added and mixed, the polymers, that is the one or more chlorinated polyethylene elastomers, the one or more optional chlorosulfinated polyethylenes, and the one or more ethylene-acrylic elastomers are added generally in any order and mixed until generally a homogenius blend is obtained. The compounded rubber can then be cooled in any manner and deposited as a slab which desirably has an anti-crack agent on the surface thereof. When desired, the compounded chlorinated rubber composition of the present invention in then added to a high shear mixing device which can be the same or different as utilized in the formation of the compounded rubber and is mixed with the one or more vulcanizing agents and one or more co-agents at a low temperature so that the composition is not cured. The compounded rubber containing the curing additives can be formed into any desired shape such as a tube utilizing an extruder. The chlorinated rubber compositions of the present invention generally have a good shelf life as from about 35 to about 45 days whereby they can be transferred to an end fabricator and cured at suitable temperatures.

Suitable end forms include sheets, tubes, hoses, and seals. A desired end use of the chlorinated rubber compositions of the present invention are as a hose or a tube for use in conveying vehicle transmission fluids and especially E-type transmission fluids inasmuch as the compounded rubbers have good resistance thereto. An automatic transmission "E" fluid specification is WSA-M96D26-A of the Ford Motor Company. Such specification is hereby substantially reproduced as follows:

HOSE, REINFORCED RUBBER, AUTOMATIC WSA-M96D26-A

TRANSMISSION FLUID RESISTANT

1. Scope

This specification defines a straight or formed synthetic rubber hose reinforced with a single ply of braided textile, with good resistance to automatic transmission fluid.

2. Application

This specification was released originally for an automatic transmission oil cooler hose. The hose is resistant to long term exposure to automatic transmission fluid up to 150° C. and air temperatures up to 125° C. For applications requiring air-temperatures above 125° C., consider WSD-M96D13-A.

3. Requirements 3.1 Qualilty System Requirements

Material suppliers and part producers must conform to Quality System Requirements, QS-9000. Material specification requirements are to be used for initial qualification of materials. A Control Plan for ongoing production verification is required. This plan must be reviewed and approved by the relevant Ford Materials activity and/or Ford Supplier Technical Assistance (STA) prior to production parts submission. Appropriate statistical tools must be used to analyze process/product data and assure consistent processing of the materials.

Part producers using this material in their products, must use Ford approved materials and must conform to a process control plan which has been approved by STA and/or the relevant Materials Activity.

3.2 Infrared Spectrophotometry and/or Thermal Analysis

Ford Motor Company, at its option, may conduct infrared and/or thermal analysis of material/parts supplied to this specification. The IR spectra and thermograms established for initial approval shall constitute the reference standard and shall be kept on file at the designated material laboratory. All samples shall produce IR spectra and thermograms that correspond to the reference standard when tested under the same conditions.

3.3 Conditioning and Test Conditions

All test values indicated herein are based on material conditioned in a controlled atmosphere of 23+/−2C. and 50+/−5% relative humidity for not less than 24 hours prior to testing and tested under the same conditions unless otherwise specified.

3.4 Hose Construction

The hose shall consist of a smooth bore synthetic rubber tube and high temperature and oil resistant synthetic rubber cover (see paragraph 5.2). The tube shall be covered with a single ply of suitable braided reinforced textile. The hose may be coupled with a crimped metal end-fittings.

3.5 Material Testing

The following tests shall be performed on finished hoses and/or test specimens cut from them. The test specimens shall be die-cut from the finished parts and buffed or slit to the required thickness where necessary. When not feasible, specimens cut from moulded test slabs manufactured from the same material with an equivalent state of cure shall be used. The test slabs shall have the following dimensions: 150×150 mm, min×2.0+/−0.2 mm

| 3.6 ORIGINAL PROPERTIES | | Tube | Cover |
|---|---|---|---|
| 3.6.1 | Hardness, International (ISO 1183, Method A/ASTM D 1415) | 65-80 | 65-80 |
| 3.6.2 | Hardness, Durometer A (ISO 868/ASTM D 2240, instantaneous, plied-up specimen) | 65-80 | 65-80 |
| 3.6.3 | Tensile Strength, MPa, min (ISO 37/ASTM D 4123, Die C) | 9 | 9 |
| 3.6.4 | Elongation, %, min (ASTM D 412, Die C) | 110 | 200 |
| 3.6.5 | Ozone Resistance, Rating, max (FLTM BP 101-01 m Procedure A or B) | 0 | 0 |
| 3.6.6 | Compression Set, %, max (ISO 815/ASTM D 395, Method B, 70 h at 125 +/− 2 C) | 60 | 65 |

| 3.7 AGED PROPERTIES | | |
|---|---|---|
| 3.7.1 | Heat Aged, Cover Only (ISO 188/ASTM D 573, 168 h at 150 +/− 2 C) | |
| | Hardness Change | 0 to +10 IRHD |
| | Tensile Strength Change, max | −10% |
| | Elongation at Break Change, max | −40% |
| | Visual Evaluation | |
| | No surface tackiness or cracks when folded flat against itself. | |
| 3.7.2 | Heat Aged, Cover Only (ISO 188/ASTM 0 573, 1000 h at 120 +/− 2 C) | |
| | Hardness Change | 0 to 25 IRHD |
| | Tensile Strength Change, max | −20% |
| | Elongation at Break Change, max | −65% |
| | Visual Evaluation | |
| | No surface tackiness or cracks when folded flat against itself. | |
| 3.7.3 | Immersion in Currently Released Production Automatic Transmission Fluid, Tube Only (ISO 1817/ASTM D 471, 168 h at 150 +/− 2 C, see paragraph 5.1) | |
| | Hardness Change | 15 IRHD |
| | Tensile Strength Change, max | −50% |
| | Elongation at Break Change, max | −65% |
| | Volume Change | 0 to + 35% |
| | Visual Evaluation | |
| | No surface tackiness or cracks when folded flat against itself. | |
| 3.7.4 | Immersion in Currently Released Production Automatic Transmission Fluid, Tube Only (ISO 1817/ASTM D 471, 1000 h at 135 +/− 2 C, see paragraph 5.1) | |
| | Hardness Change | 15 IRHD |
| | Tensile Strength Change, max | −60% |
| | Elongation at Break Change, max | −85% |
| | Volume Change | 0 to 35% |
| | Visual Evaluation | |
| | No surface tackiness or cracks when folded flat against itself. | |
| 3.7.5 | Immersion in Oil IRM 903 (ISO 1817/ASTM D 471, 168 h at 150 +/− 2 C) | |
| | Hardness Change | −25 IRHD |
| | Tensile Strength Change, max | −40% |
| | Elongation at Break Change, max | −55% |
| | Volume Change, max | 0 to + 65% |
| | Visual Evaluation | |
| | No surface tackiness or cracks when folded flat against itself. | |

| 3.8 FINISHED PART | | |
|---|---|---|
| 3.8.1 | Burst Pressure, min (ASTM D 380) | 6.9 MPa |
| 3.8.2 | Adhesion, min (ASTM D 413, Strip Method, Type A) | 1.4 N/mm |
| 3.8.3 | Tensile Strength (ASTM D 380, 25 mm/minute) | |

This requirement applies only when couplings are used with the hose. Assemblies must withstand a minimum pull of 1.1 kN without the couplings separating from the hose, leakage at coupling connection or rupture of the hose.

| 3.8.4 | Low Temperature Flexibility Oil Aging/Cold Soak | No breaks or cracks |
|---|---|---|

Test Method: Hose assembly shall be filled with current production approved automatic transmission fluid (see Paragraph 5.1), closed at both ends and heat aged at 150 +/−2 C. for 24 h. The aged assemblies, after cooling to 23 +/−2 C., shall be conditioned at —40+/−1 C. for 24 h. After conditioning and while in the cold box, the hose assembly shall be bent around a temperature conditioned mandrel, having a radius equal to the minimum bend radius of 10 times the I.D. Flexing shall be accomplished within 4 s.

| 3.8.5 | Accelerated Impulse Test |
|---|---|

Test Method: Hose assemblies and/or uncoupled hose, where applicable shall be preconditioned by filling with current production approved automatic transmission fluid (see paragraph 5.1), closed at both ends and heat aged at 150+/−2 C. for 70 h prior to impulse testing. For initial qualification the aged hose assemblies must withstand 250,000 impulse cycles at maximum working pressure of 1.1 MPa without bursting or show any signs of failure. Hose assemblies removed from test stand and burst pressure tested shall not average more than 20% below the average of original results per paragraph 3.8.1. Periodic certification testing thereafter shall require aged assemblies to withstand 100,000 impulse cycles at maximum working pressure of 1.1 MPa without failure while maintaining temperatures of transmission fluid at 150° C. and the ambient air chamber at 125° C. Burst strength values from hose assemblies after completion of 100,000 impulse cycles shall not average more than 15% below the average of original results (paragraphs 3.8.1 and 3.8.3).

| Impulse Test Conditions: | |
|---|---|
| Oil Temperature | 150 +/− 3 C. |
| Ambient Temperature | 125 +/− 5 C. |
| Cycle Rate | 30-40/minute |
| Cycle Data: | |
| Pressure Rise Time | 0.20 +/− 0.02 s |
| High Pressure Hold Time | 0.65 +/− 0.02 s |
| Pressure Drop | 0.20 +/− 0.10 s |
| Pressure Variation | 0-1.10 MPa |
| Hydraulic Fluid | Currently Released Automatic Transmission Fluid (see para 5.1) |

| 3.8.5.1 | Oil and Heat Resistance |
|---|---|

After successful completion of 100,000 impulse cycles according to paragraph 3.8.5, standardized ASTM specimens taken from the hose shall not exceed the following values:

| | Tube | Cover |
|---|---|---|
| Hardness, Change, max | −15 | +15 |
| Tensile Strength Change, % max | −50 | +35 |
| Elongation at Break Change, % max | −60 | −65 |

| 3.8.6 | Resistance to Kinking |
|---|---|

Test Method: Insert required length of hose on test fixture securing each end with metal clamps. When installing hose, it shall be bent within 5 s in the same plane and direction as its free state curvature. Place fixture in an oven at 120+/−2 C. for 1 h. Remove fixture from oven and within 5 minutes pass a steel ball of specified diameter through hose installed on fixture. Ball must pass freely.

| I.D. Typical Range mm | Test Sample Length, min +/− 3.0 mm mm | Ball Diameter mm |
|---|---|---|
| 7.1-8.7 | 300 | 3.20 +/− 0.05 |
| 8.8-10.1 | 350 | 3.95 +/− 0.05 |
| 12.1-13.3 | 450 | 5.5 +/− 0.05 |

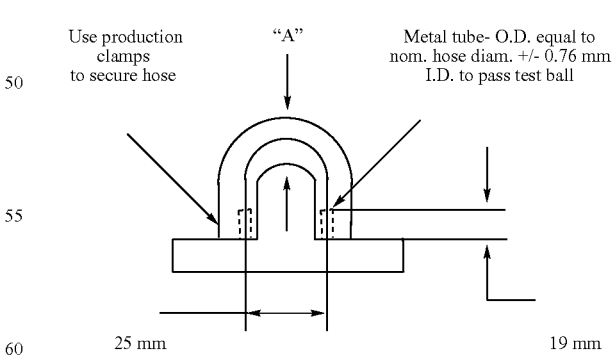

Sample Selection: Production hose selected for the kink test should represent, as nearly as possible, minimum wall thickness. When recording results include wall thickness, ovality, and dimension "A" (see above). This dimension is measured while sample is on the test fixture.

The invention will be better understood by reference to the following examples which serve to illustrate the invention but not to limit the same.

cooling and forming into slabs, the chlorinated polyethylene composition was then mixed with the indicated curing agents at a low temperature of at about 200° F. to 250° F. and then

TABLE 1

| INGREDIENTS | CHEMICAL NAME | FUNCTION OF INGREDIENT | EXAMPLE A |
|---|---|---|---|
| Tyrin CM 0836 | Chlorinated Polyethylene Polymer-36% Cl, Mooney 100 | Polymer | 70 |
| Vamac DP | Ethylene/Acrylic Elastomer-High levels of methyacrylate in polymers, composition proprietary | Polymer | 30 |
| Maglite DE | Magnesium Dioxide | Activator / Acid Scavenger | 3.5 |
| DHT-4A-2 | Magnesium Aluminum Hydroxy Carbonate | Activator / Acid Scavenger | 7.5 |
| AC Poly 617A | Polyethylene Wax | Process Aid | 2 |
| N990 | Carbon Black | Filler | 135 |
| Hubercarb Q325 | Calcium Carbonate | Filler | 10 |
| Paraplex G62 | Epoxidized Soybean Oil | Plasticizer | 15 |
| Plasthall P-670 | Polyester Adipate | Plasticizer | 27 |
| Vulcup 40KE | 2,2'-bis(tert-butylperoxydiisopropylbenzene) | Vulkanizing Agent | 5 |
| Trigonox 29-40B-PD | 1-1-di(tert-butylperoxy)-3,3,5-trimethylcyclhexane | Vulkanizing Agent | 0.15 |
| TAC DLC-A | Triallyl Cyanurate | Co-Agent | 7.5 |
| Vanax MBM | N-N'-m-phenylenedimaleimide | Co-Agent | 0.5 |
| Total | | | 313.15 |

EXAMPLES

The various ingredients of Table 1 were compounded in a manner as set forth above. That is all the non-curing components were added one by one to a high shear mixer such as those made by Farrel or Krupp and blended with the polymers being added last. Total mixing time was generally from about 3 to about 10 minutes with about 4 minutes being preferred, and the mixing temperature of the mixer was 250° F. to about 320° F. with approximately 300° F. being preferred. After cooling and forming into slabs, the chlorinated polyethylene composition was then mixed with the indicated curing agents at a low temperature of at about 200° F. to 250° F. and then extruded into a shape of a tube. Subsequently, the tube was cured at about 345° F. for approximately 13 minutes and tested. Examples 1, 3 and 4 were rubber compositions tested after various production runs whereas Example 2 was a rubber composition made in the form of a hose and removed there from and tested. The following properties were obtained.

TABLE 2

| | Example 1 (production) | Example 2 Off Hose - | Example 3 (Production) | Example 4 (Production) |
|---|---|---|---|---|
| WSA-M96D26-A | | | | |
| Tensile, psi (1305 min) | 1470 | — | 1680 | 1620 |
| Elongation, % (110% min) | 212 | 175 | 190 | 193 |
| Durometer, (65-80) | 73 | 65 | 73 | 73 |
| 50% Modulus | — | — | 420 | 404 |
| Compression Set, Plied | — | — | — | — |
| 70 hrs. at 125° C., 60% max | 61 | 54.1 | 60.7 | 61.6 |
| ATF-D, 168 hours at 150 C. | | | | |
| Tensile Change, % (−50% max.) | −3 | 3 | 0 | 5 |
| Elongation Change, % (−65% max.) | −37 | −23 | −22 | −25 |
| Hardness Change, (−15 pts. Max.) | −2 | −11 | −1 | −1 |
| % Volume Change, 0 / +35% | 8.3 | 7 | 9.4 | 8.2 |
| ATF-E, 168 hours at 150 C. | 8 | 14 | 5 | 32 |
| Tensile Change, % (−50% max.) | −60 | −62 | −51 | −52 |
| Elongation Change, % (−65% max.) | 9 | −2 | 9 | 12 |
| Hardness Change, (−15 pts. Max.) | 9.9 | 6.1 | 10.7 | 9.2 |
| % Volume Change, 0 / +35% | — | — | 1082 | 1218 |
| 50% Modulus | 8 | 14 | 5 | 32 |
| IRM 903 Oil, 168 hours at 150 C. | | | | |
| Tensile Change, % (−40% max.) | 8 | 14 | 5 | 32 |
| Elongation Change, % (−55% max.) | −60 | −62 | −51 | −52 |
| Hardness Change, (−25 pts. Max.) | 9 | −2 | 9 | 12 |
| % Volume Change, 0 / +65% | 9.9 | 6.1 | 10.7 | 9.2 |

Examples 1 through 4 gave excellent results with respect to low change in various properties such as tensile strength, elongation, hardness, and percent volume at high temperatures. Moreover, such tubing passed the "E" type transmission fluids tests.

High Heat Resistant Rubber Compositions

The formulations of the high heat resistant rubber compositions are based upon 70 parts by weight of one or more chlorinated polyethylene elastomers. The amount of chlorine in the elastomer is generally from about 20% to about 45% by weight, and preferably from about 25% to about 30% by weight. If two or more different chlorinated polyethylene elastomers are utilized, the amount of one of the elastomers is generally from about 1% to about 99% and desirably from about 25% to about 75% by weight based upon the total weight of the chlorinated polyethylene elastomers. Such elastomers are known to the art and to the literature. Examples of such suitable chlorinated polyethylene elastomers include Tyrin CM 0730 which contains about 30% by weight of chlorine and has a Mooney viscosity (ML 1+4/100° C.) of about 65, Tyrin CM 0836 which contains about 36% by weight of chlorine and has a Mooney viscosity of about 100, and Tyrin CM 0136 which contains about 36% by weight of chlorine and has a Mooney viscosity of about 80. The Tyrin chlorinated polyethylene elastomers are produced by DuPont Dow.

An important aspect of the present invention is to utilize an ethylene-octene copolymer in an amount of from about 5 to about 49 parts by weight, desirably from about 12 to about 30 and preferably from about 10 to about 20 parts by weight per 70 parts by weight of the one or more chlorinated polyethylene elastomers. Such copolymers generally contain from about 25% to about 55% by weight and desirably from about 35% to about 45% by weight of the octene unit. Desirably the copolymers have a low specific gravity of from about 08.5 to about 08.7 and have a melt index of from about 0.25 to about 5.0 dg/min. Such copolymers are available as the Engaged polymers produced by DuPont Dow such as Engaged CL 8001, Engaged CL 8002, Engaged EG 8200, and preferably Engaged EG 8150.

An important component utilized to form the high heat resistance rubber composition generally comprise one or more ethylene-acrylic elastomers wherein the acrylic portion can be an alkyl acrylate wherein the alkyl desirably has from about 1 to about 8 carbon atoms and preferably is methyl acrylate. The ethylene-acrylic elastomers generally have a Mooney viscosity of from about 10 to about 25 and preferably from about 13 to about 19. The total amount of the one or more ethylene-acrylic elastomers is generally from about 5 to about 49 parts, desirably from about 5 to about 35 parts, and preferably from about 10 to about 30 parts by weight per 70 parts by weight of said one or more chlorinated polyethylene elastomers. Examples of suitable elastomers include Vamac D, Vamac DLS, Vamac G, Vamac GLS, and Vamac HG with Vamac DP being highly preferred.

In lieu of the ethylene-acrylic elastomer or in any portion therewith, one or more polyacrylate elastomers can be utilized which are known to the art and to the literature. Generally, polyacrylate elastomers contain repeat units of alkyl acrylates wherein the alkyl portion desirably has from 1 to about 8 carbon atoms, and preferably is methyl acrylate or ethyl acrylate. Generally lesser amounts of alkoxy acrylates are also utilized wherein the alkoxy portion generally has from 1 to 5 carbon atoms with methoxy or ethoxy being preferred. The Mooney viscosity of the one or more acrylate elastomers is generally from about 10 to about 70 and preferably from about 25 to about 40 or 55. The amount of the polyacrylic elastomers is generally from about 5 to about 49 parts, desirably from about 5 to about 35 parts, and preferably from about 10 to about 30 parts by weight per 70 parts by weight of said chlorinated polyethylene elastomers. The polyacrylic elastomer can be utilized either in lieu of the one or more ethylene-acrylic elastomers or partially substituted therefore. In other words, any combination of the ethylene-acrylic elastomers or the polyacrylic elastomers can be utilized with the total amount of both being from about 5 to about 49 parts by weight, desirably from about 5 to about 35 parts by weight and preferably from about 10 to about 30 parts by weight per 70 parts by weight of said-polychlorinated polyethylene elastomers. Inasmuch as the present invention generally relates to peroxide cure, polyacrylates are utilized which are curable by a peroxide. Since the polyacrylates have a saturated backbone, crosslinking is accomplished via incorporation of a co-polymerized reactive cure site such as through the use of suitable peroxide reactive compounds such as a carboxylic acid, and the like. A suitable polyacrylic elastomer is HyTemp PV-04 made by Zeon Chemicals.

An optional component of the high heat resistant rubber composition are various EPDM polymers wherein the amount of ethylene repeat groups is generally from about 30% to about 70% and preferably from about 35% to about 60% by weight, and wherein the amount of diene is generally from about 0.1 to about 8% and desirably from about 0.2% to about 2% by weight based upon the total weight of the copolymer. The amount of the EPDM rubber is generally from about 10 to about 50 parts by weight, desirably from about 12 to about 35 parts by weight and preferably from about 15 to about 25 parts by weight per 70 parts by weight of the one or more chlorinated polyethylene elastomers. A preferred commercial example of such as compound is Nordel IP NDR-125 produced by R. T. Vanderbilt.

An optional component of the chlorinated rubber composition is a chlorosulfonated polyethylene which generally contains from about 25% to about 45%, desirably from about 30% to about 40% and preferably from about 33% to about 38% by weight of chlorine therein. The amount of sulfur is generally very low as from about 0.25% to about 2%, desirably from about 0.5% to about 1.5%, and preferably from about 0.75% to about 1.25% by weight based upon the total weight of the chlorosulfonated polyethylene. One or more chlorosulfonated polyethylenes when utilized is generally from about 5 to about 49 parts by weight, desirably from about 10 to about 40, and preferably from about 25 to about 35 parts by weight per 70 parts by weight of said one or more chlorinated polyethylene elastomers. Examples of such suitable compounds include the various Hypalon compounds from DuPont Dow such as Hypalon 20, Hypalon 30, with Hypalon 40 being preferred which contains approximately 35% chlorine by weight and approximately 1% sulfur by weight.

One or more antioxidants are utilized to help impart high heat resistance to the composition. Numerous antioxidants exist and the same are known to the art and to the literature. Specific preferred examples of such compounds include Tetrakis [methylene (3,5-di-t-butyl-4-hydroxylhydrocinnamate)] methane mixed with Pentaerythritol tris ester and 3-(3,5-di-(tert)-butyl-4-hydroxyphenyl)proionic acid; Thiodiethylene Bis(3,5-Di(tert)-Butyl-4-hydroxyhydrocinnamate; and the like. The total amount of such one or more compounds is generally from about 0.1 to about 4, and preferably from about 0.5 to about 2 parts by weight per 70 total parts by weight of the one or more chlorinated polyethylene elastomers. Commercial examples of such antioxidants include Irganox 1010 and Irganox 1035 produced by Ciba Speciality Chemicals.

The high heat resistant rubber compositions can generally contain conventional additives known to the art and to the literature. Such additives can be the same as set forth above, that is various activators and/or acid scavengers, processing aids, various fillers which also serve as reinforcing aids, plasticizers, vulcanizing compounds and co-agents such as activators, lubricants, stabilizers, and the like. Since the description of such additives is set forth hereinabove with respect to the chlorinated rubber fluid resistant compositions, they are hereby fully incorporated by reference. Generally the same types of additives can be utilized and the amounts of the various additives are generally the same. However, with respect to carbon black, generally a smaller amount is utilized as from about 40 to about 200 parts by weight, and desirably from about 70 to about 150 parts by weight per 70 parts by weight of the one or more chlorinated polyethylene elastomers. Moreover, the amount of the calcium carbonate fillers is generally from about 5 to about 50 parts by weight and desirably from about 10 to about 40 parts by weight per 70 parts by weight of the one or more chlorinated polyethylene elastomers.

Various vulcanizing agents as well as co-agents (accelerators) can be utilized. Numerous such compounds exist and are known to the art and to the literature. With respect to specific chemical examples and specific commercial examples, generally the same compounds can be utilized as set forth above with regard to the chlorinated rubber compositions and generally the same amounts of the vulcanizing agents and co-agents can be utilized. Accordingly, they are hereby fully incorporated by reference.

A preferred end use of the present invention is to co-extrude the high heat resistant rubber composition about the chlorinated polyethylene rubber fluid resistant composition in the form of a tube to form a laminated tube, hose, or the like. In order to impart strength to the hose, reinforcing fibers, either non-woven or preferably woven, can be used.

A preferred end use is a formation of a hose for use with a vehicle automatic transmission fluid such as the above noted E-type fluid.

The invention will be better understood by reference to the following example which serves to illustrate but not to limit the present invention.

In formation of the high heat resistant rubber composition of Table 3, the various additives are added in any order, one by one to a high shear mixer followed by the addition of the various polymers, as for example one at a time, and mixed at a suitable temperature and time to achieve a blend of a high heat resistant rubber composition. The compounding procedure is essentially the same as set forth above with regard to the chlorinated polyethylene rubber fluid resistant composition. Thus, the high shear mixer utilized can be the same. The mixing temperature of the high shear mixer with respect to the high heat resistant rubber composition is generally from about 250° F. to about 230° F. with about 300° F. being preferred and the mixing time can vary from about 3 to about 10 minutes with about 4 minutes being preferred. As before, once the composition is blended, it can be cooled and stored. At some subsequent time, the one or more vulcanizing agents and co-agents are added and mixed at a low temperature such as at about 200° F. to about 250° F. so as not to cure the rubber.

Once it is desired to form an end product, the high heat resistant rubber compositions containing the curing compounds therein can be mixed at a higher temperature and formed or shaped into a suitable end product and cured as at a temperature of from about 330° F. to about 360° F. for about 10 to about 18 minutes. Suitable end products include sheets, jackets on existing tubing or hoses, seals, and the like.

TABLE 3

| INGREDIENTS | Chemical Name | Function of Ingredient | Example A |
|---|---|---|---|
| Tyrin CM 0730 | Chlorinated Polyethylene Polymer-30% Cl, Mooney 65 | Polymer | 70 |
| Engage 8150 | Ethylene-Octene Polymer - 39% Comonomer, .868 sp. Gravity, Melt Index 0.5 dg/min | Polymer | 15 |
| Vamac DP | Ethylene/Acrylic Dipolymer-High levels of methyacrylate in polymers, composition proprietary | Polymer | 15 |
| Maglite DE | Magnesium Dioxide | Activator / Acid Scavenger | 3.5 |
| AC Poly 617A | Polyethylene Wax | Processing Aid | 2 |
| Irganox 1010 | Tetrakis [methylene (3,5-di,-t-butyl-4-hydroxyhydrocinnamate)] methane mixed with Pentaerythritol tris ester and 3-(3,5-di-(tert)-butyl-4-hydroxyphenyl) proionic acid | Antioxidant | 1 |
| DHT-4A-2 | Magnesium Aluminum Hydroxy Carbonate | Activator / Acid Scavenger | 7.5 |
| N990 | Carbon Black | Filler | 90 |
| Hubercarb Q325 | Calcium Carbonate | Filler | 20 |
| Paraplex G62 | Epoxidized Soybean Oil | Plasticizer | 11 |
| TOTM | Trioctyl Trimellitate | Plasticizer | 11 |
| Nordel IP NDR-125 | Ethylene-Propylene-Diene, Terpolymer - 42.5% Ethylene, 0.5% Diene | Polymer/ Plasticizer | 20 |
| Vulcup 4OKE | 2,2'-bis(tert-butylperoxydiisopropylbenzene) | Vulkanizing Agent | 4.5 |
| Trigonox 29-40B-PD | 1-1-di(tert-butylperoxy)-3,3,5-trimethylcyclhexane | Vulkanizing Agent | 0.15 |
| Ricon 152 DLC 70% | 1,2-Polybutadiene dispersed on Calcium Silicate | Co-Agent | 8 |
| TAC DLC-A | Triallyl Cyanurate | Co-Agent | 4.5 |
| Vanax MBM | N-N'-m-phenylenedimaleimide | Co-Agent | 0.75 |
| Total | | | 283.90 |

When the high heat resistant rubber composition was prepared, and tested, the following data was obtained:

TABLE 4

| INGREDIENTS | Chemical Name | Function of Ingredient | Example A |
|---|---|---|---|
| WSA-M96D26-A | | | |
| Tensile, psi (1305 min) | | | 1790 |
| Elongation, % (110% min) | | | 230 |
| Durometer, (65-80) | | | 78 |
| 70 hrs. at 125° C., 65% max | | | 42.8 |
| Tensile Change, % (−10% max.) | | | 10 |
| Elongation Change, % (−40% max.) | | | −21 |
| Hardness Change, pts. (+10 pts.) | | | 7 |
| Ozone, D518-99, Conditioned for 24 hrs. | | | pass |

As apparent from the above data, the high heat chlorinated polyethylene rubber composition had small changes in various properties such as tensile strength, elongation and hardness when tested 168 hours at 150° C.

While in accordance with the patent statutes the best mode and preferred embodiment have been set forth, the scope of the invention is not intended to be limited thereto, but only by the scope of the attached claims.

What is claimed is:

1. A curable rubber composition, comprising:
    at least one chlorinated polyethylene elastomer having from about 25% to about 50% chlorine by weight, the total amount of the chlorinated polyethylene elastomer being about 70 parts by weight;
    at least one ethylene-acrylic elastomer having a Mooney viscosity of from about 10 to about 25 and/or at least one polyacrylic elastomer having a Mooney viscosity of from about 10 to about 70, the total amount of the ethylene-acrylic elastomer and/or the polyacrylic elastomer being from about 5 to about 49 parts by weight per 70 parts by weight of the chlorinated polyethylene elastomer.

2. The curable rubber composition of claim 1, wherein the amount of the chlorine of the chlorinated polyethylene elastomer is from about 30% to about 45% by weight.

3. The curable rubber composition of claim 1, wherein the ethylene-acrylic elastomer has a Mooney viscosity of from about 13 to about 19 and wherein the polyacrylic elastomer has a Mooney viscosity of from about 25 to about 55, and wherein the amount of the ethylene-acrylic elastomer and the polyacrylic elastomer is from about 5 to about 40 parts by weight per 70 parts by weight of the chlorinated polyethylene elastomer.

4. The curable rubber composition of claim 1, further comprising: a) carbon black in an amount of from about 50 parts to about 300 parts by weight per 70 parts by weight of the chlorinated polyethylene elastomer; and b) a plasticizer in the amount of from about 1 to about 60 parts by weight per 70 parts by weight of the chlorinated polyethylene elastomer.

5. The curable rubber composition of claim 1, wherein the amount of the chlorine of the chlorinated polyethylene elastomer is from about 36% to about 42% by weight, and wherein the amount of the ethylene-acrylic elastomer and/or the polyacrylic elastomer is from about 25 to about 35 parts by weight per 70 parts by weight of the chlorinated polyethylene elastomer.

6. The curable rubber composition of claim 1, further comprising a chlorosulfonated polyethylene elastomer having a chlorine content of from about 25% to about 45% by weight and having a sulfur content of from about 0.25% to about 2% by weight, and wherein the amount of the chlorosulfonated polyethylene elastomer is from about 5 parts to about 49 parts by weight per 70 parts by weight of the chlorinated polyethylene elastomer.

7. The cured rubber composition of claim 1.

8. The curable rubber composition of claim 6, wherein the amount of the chlorosulfonated polyethylene elastomer is from about 25 to about 35 parts by weight per 70 parts by weight of the chlorinated polyethylene elastomer.

9. A curable rubber composition, comprising:
    at least one chlorinated polyethylene elastomer having from about 25% to about 50% chlorine by weight, the total amount of the chlorinated polyethylene elastomer being about 70 parts by weight; and
    at least one ethylene-acrylate elastomer having a Mooney viscosity of from about 10 to about 25, the total amount of the ethylene-acrylate elastomer being from about 5 to about 40 parts by weight per 70 parts by weight of the chlorinated polyethylene elastomer.

10. The curable rubber composition of claim 9, wherein the chlorine of the chlorinated polyethylene elastomer is about 30% by weight per 70 parts by weight of the chlorinated polyethylene elastomer.

11. The curable rubber composition of claim 9, wherein the amount of the ethylene-acrylic elastomer is about 15 parts by weight per 70 parts by weight of the chlorinated polyethylene elastomer.

12. The curable rubber composition of claim 9, further comprising a chlorosulfonated polyethylene elastomer having a chlorine content of from about 25% to about 45% by weight and having a sulfur content of from about 0.25% to about 2% by weight, and wherein the amount of the chlorosulfonated polyethylene elastomer is from about 10 parts to about 40 parts by weight per 70 parts by weight of the chlorinated polyethylene elastomer.

13. The curable rubber composition of claim 9, wherein the ethylene-acrylic elastomer is ethylene methacrylic elastomer.

14. The cured rubber composition of claim 9.

* * * * *